(12) United States Patent
Wardropper et al.

(10) Patent No.: US 10,864,690 B2
(45) Date of Patent: Dec. 15, 2020

(54) WIND TURBINE BLADE MANUFACTURING METHOD OR APPARATUS

(71) Applicant: Vestas Wind Systems A/S, Aarhus N. (DK)

(72) Inventors: Steve Wardropper, New Milton (GB); Stephen Sandercock, Ryde (GB)

(73) Assignee: Vestas Wind Systems A/S, Aarhus N. (DK)

( * ) Notice: Subject to any disclaimer, the term of this patent is extended or adjusted under 35 U.S.C. 154(b) by 282 days.

(21) Appl. No.: 15/759,847

(22) PCT Filed: Sep. 15, 2016

(86) PCT No.: PCT/DK2016/050300
§ 371 (c)(1),
(2) Date: Mar. 14, 2018

(87) PCT Pub. No.: WO2017/045690
PCT Pub. Date: Mar. 23, 2017

(65) Prior Publication Data
US 2018/0250895 A1 Sep. 6, 2018

(30) Foreign Application Priority Data

Sep. 15, 2015 (DK) .................................. 2015 70590

(51) Int. Cl.
*B29C 70/00* (2006.01)
*B29C 70/54* (2006.01)
(Continued)

(52) U.S. Cl.
CPC .......... *B29C 70/541* (2013.01); *B29C 70/345* (2013.01); *B29D 99/0028* (2013.01);
(Continued)

(58) Field of Classification Search
CPC . B29C 70/541; B29C 70/345; B29D 99/0028; Y02P 70/523; F03D 1/0675; F03D 1/0683; B29L 2031/085
See application file for complete search history.

(56) References Cited

U.S. PATENT DOCUMENTS

2013/0239379 A1* 9/2013 Rajasingam ............ B29C 33/12
29/23.51
2015/0033544 A1* 2/2015 De Waal Malefijt ........................
B29C 66/721
269/21
(Continued)

FOREIGN PATENT DOCUMENTS

CN 101905538 A 12/2010
CN 102554817 A 7/2012
(Continued)

OTHER PUBLICATIONS

European Patent Office, Examination Report in EP Application No. 16770202.6, dated Jun. 17, 2019.
(Continued)

*Primary Examiner* — Jacob T Minskey
*Assistant Examiner* — Adrien J Bernard

(57) ABSTRACT

A positioning jig (25) and a method for manufacturing a wind turbine blade comprising moulding a first and a second blade shell portion in respective first and second mould tools; positioning a shear web (15) in a spanwise direction within a first shell portion (20) in a said first mould tool (7); anchoring said shear web in position in said first shell portion; and closing said second shell portion (21) over said first shell portion to thereby generate a wind turbine blade shell defining a chordwise extent between a in trailing edge and a leading edge thereof, and a spanwise extent between a root region and a tip thereof and wherein said shear web, bordered by a first (24) and a second longitudinal edge,
(Continued)

Figure 1:
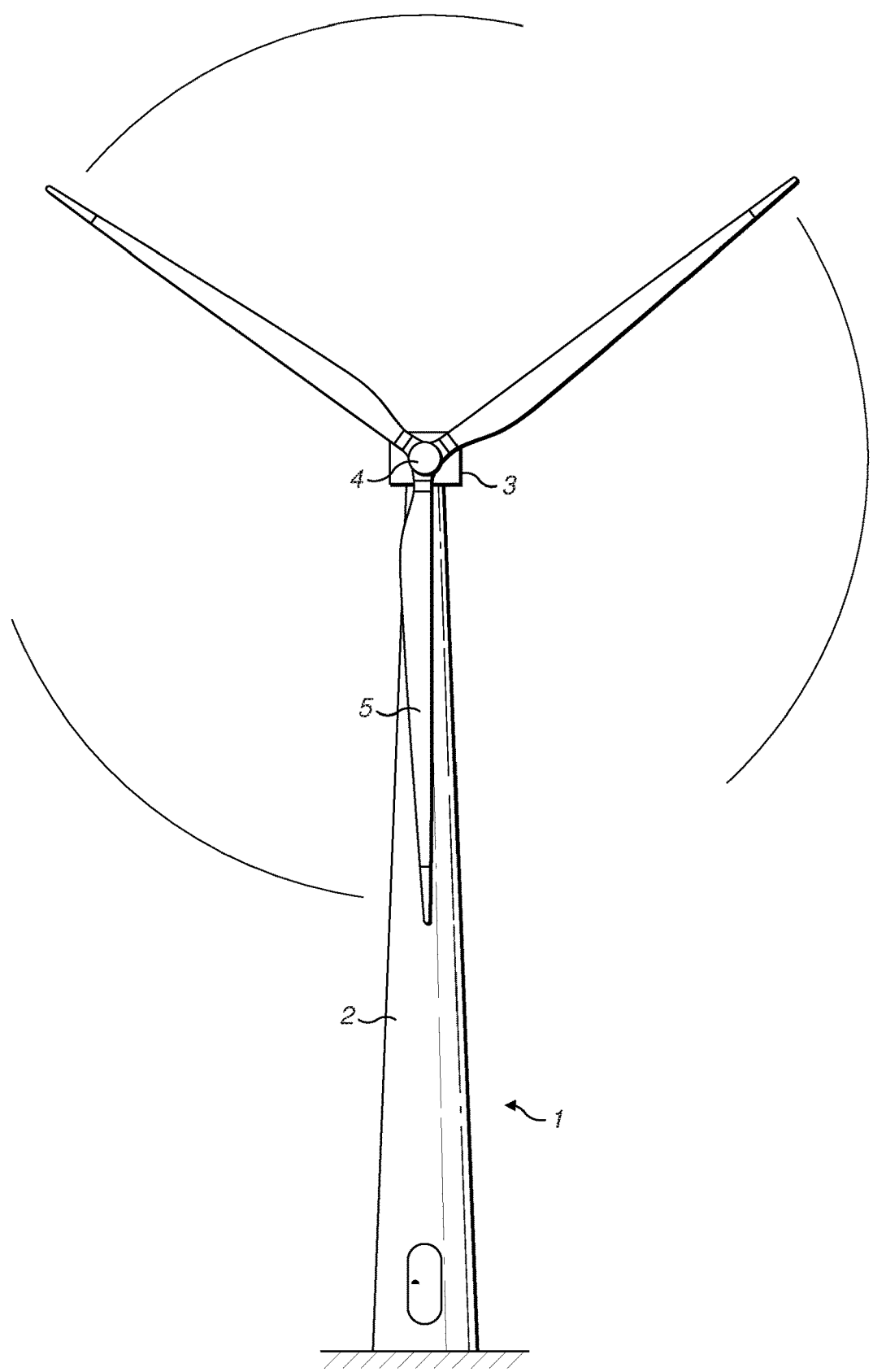

extends in a thickness direction of said blade; said method further comprising: providing a positioning jig; and securing said positioning jig to said shear web, prior to its introduction into said first shell portion and guiding said shear web into its predetermined standing position in said first shell portion, with its first longitudinal edge adjacent said first shell portion, by engaging a reference surface (33) of said positioning jig with a locating surface (12) at said first mould tool thereby to bring said positioning jig into its guide position with said shear web in its predetermined standing position; and removing said positioning jig from said first mould tool prior to closing said second shell portion over said first shell portion. A shear web, especially an upper edge thereof, may be additionally secured to the blade shell using ligaments (30) prior to removal of the positioning jig.

10 Claims, 8 Drawing Sheets

(51) Int. Cl.

| | | |
|---|---|---|
| *B29D 99/00* | (2010.01) | |
| *B29C 70/34* | (2006.01) | |
| *B29L 31/08* | (2006.01) | |
| *B29K 105/10* | (2006.01) | |
| *F03D 1/06* | (2006.01) | |

(52) U.S. Cl.
CPC ..... *B29K 2105/10* (2013.01); *B29L 2031/085* (2013.01); *F03D 1/0675* (2013.01); *Y02P 70/50* (2015.11)

(56) References Cited

U.S. PATENT DOCUMENTS

2015/0136305 A1\* 5/2015 Ullmann ................. B25J 9/026
156/64

2015/0252780 A1\* 9/2015 Jonnalagadda ....... F03D 1/0675
416/226

FOREIGN PATENT DOCUMENTS

| CN | 102794724 A | 11/2012 | | |
|---|---|---|---|---|
| CN | 202826413 U | 3/2013 | | |
| CN | 104416917 A | 3/2015 | | |
| CN | 204505050 U | 7/2015 | | |
| DE | 102008022548 A1 | 11/2009 | | |
| DE | 102013224392 A1 | 5/2015 | | |
| EP | 2261501 A2 | 12/2010 | | |
| EP | 3019744 A1 | 5/2016 | | |
| EP | 3074183 A1 | 10/2016 | | |
| WO | WO2014094780 | * | 6/2014 | ............. B25B 11/00 |
| WO | 2015078561 A1 | 6/2015 | | |

OTHER PUBLICATIONS

China National Intellectual Property Administration, First Notification of Office Action in CN Application No. 201680066087.X, dated Jul. 3, 2019.

European Patent Office, International Seach Report and Written Opinion in PCT Application No. PCT/DK2016/050300, dated Jan. 4, 2017.

European Patent Office, International Preliminary Report on Patentability in PCT Application No. PCT/DK2016/050300, dated Aug. 7, 2017.

Danish Patent and Trademark Office, Search and Examination Report in PA 2015 70590, dated Mar. 21, 2016.

China National Intellectual Property Administration, 2nd Notification of Office Action in CN Application No. 201680066087.X, dated Mar. 23, 2020.

\* cited by examiner

WIND TURBINE BLADE MANUFACTURING METHOD OR APPARATUS

BACKGROUND OF THE INVENTION

The invention relates to a wind turbine blade manufacturing method and apparatus. More specifically, the invention relates to a method or apparatus for positioning a shear web in a wind turbine blade shell.

DESCRIPTION OF THE RELATED ART

A wind turbine known in the art typically comprises a wind turbine tower and a wind turbine nacelle positioned on top of the tower. A wind turbine rotor, usually comprising three wind turbine blades, is connected to the nacelle through a low speed shaft, which extends out of the nacelle front as illustrated on FIG. 1.

In recent years the development of wind turbines has moved towards making them ever larger, both in output and in size and in greater numbers. This, coupled with the perennial need to bring down the cost of energy, especially to bring down the cost of renewable energy, calls for better and more cost-efficient manufacturing methods and components for wind turbine blades.

In general a wind turbine rotor blade is made up of an aerodynamic external surface, with a progressively decreasing cross-sectional area in a spanwise direction from the blade root towards its tip and an internal, load-carrying structure which needs to resist both flapwise and edgewise loading. The external, aerodynamic surface is usually configured as a blade shell, generated and defined by a mould. Shell moulds are usually configured as two complementary mould "halves", with one half generating a blade suction (or leeward) side and the other half generating a blade pressure (or windward) side. The internal, load carrying structure inside the blade may generally extend from the blade root to its tip and may often be manufactured separately from the shell e.g. in the form of an elongate internal spar. Alternatively, the load carrying structure may be partly integrated into the blade surface, i.e. into the shell, e.g. in the form of so-called spar-caps. A blade root connection zone may serve i.a. to transfer loads from the blade into the rotor hub to which the blade is connected, normally via a pitch bearing.

Wind turbine blades known in the art are typically made from reinforced polymer resin type composite materials, with reinforcing materials including or combining one or more materials such as glass-fibre, wood, carbon fibres or certain metallic elements such as meshes. The blades are typically manufactured by moulding two blade shell halves in two co-operating mould structures. When the blade shell halves are hardened by curing of a resin matrix, the corresponding connecting surfaces are provided with an adhesive and the halves are placed on top of each other, usually by turning one mould half over onto the other. To ensure that the halves are pressed firmly together while the adhesive is hardening, pressure may be applied to the moulds, either by gravity acting on the mass of the top mould half structure or, more preferably, by pressing the upper mould down onto the bottom mould, e.g. by means of pneumatic or hydraulic cylinders or by the use of large clamps or by means of straps surrounding the two moulds or blade halves.

Where spar type load-carrying is implemented, the spar may additionally serve to fix the spacing between opposite shell halves of the blade. In the case of a load-carrying structure integrated into the shell, one or more shear webs may be introduced between internal faces of the respective shell halves, and anchored to each blade shell half. Often the shear webs may be anchored to respective shell walls at, adjacent to, or nearby so-called spar-caps which run spanwise within respective shell halves.

Such shear webs or, as the case may be, spars, may typically be introduced into the blade before its respective shell halves are closed together. This generally takes place towards the end of the moulding stage, after each shell "half" has cured in its respective mould section. Whereas spars generally describe an elongate box-section of progressively decreasing dimensions towards the tip, shear webs tend to describe an "I"- or "C"-beam shape or various combinations of these shapes. As a consequence of this and in contrast to structural spars, shear webs tend not to be reliably free-standing when arranged upright in a blade shell half.

It has therefore been suggested, when placing two coextending shear webs side-by-side in a blade shell half, to additionally provide a stabiliser in the form of a crossconnector between neighbouring webs, for at least as long as needed for the webs to be anchored in position, e.g. by curing of an adhesive seam between the web feet, or flanges, and the shell inner surface. The stabiliser should have enough strength to allow the webs to stand upright, in their correct location and without toppling over or drifting, but not enough strength to transfer loads between the webs during operation of the blade. In some cases a fragile but rigid foam connector has been suggested as a stabiliser between adjacent webs. In other cases, it has been suggested to sever the stabiliser after completion of the curing processes securing the webs in place. This method may have the advantages of being comparatively simple and low-cost. Nevertheless, in a bid to reduce blade weight, material costs and labour inputs, it may be advantageous to implement spar-caps integrated into blade shells along with a single shear-web between the spar-caps. With a single-web arrangement the stabiliser solution described in relation to two co-extending webs is not available.

In EP2261501, it has been suggested to position adjacent webs in a stationary, or bottom blade shell half by means of a shear web setting device to which the respective webs are securely attached and by means of which the webs are placed and held in position until curing of an adhesive between the web feet and the bottom shell half is completed. With the webs securely in position, adhesive may be applied to their upper flanges, and to respective shell bond lines, prior to closing the movable or top shell half over the bottom half and curing the same to finish the blade shell internal and external structure. According to EP2261501, the shear web setting device may be external to and independent of the mould and may comprise a movable gantry beam with downwardly projecting holder arms for connecting with and restraining the shear webs.

The apparatus described in EP2261501 constitutes a significant piece of capital equipment and its size takes up considerable production space. This is all the more so in the context of ever larger blades, for which it is not always an option to build or acquire larger production premises nor to build or acquire ever larger versions of existing equipment types. Therefore, it is an object of the invention to find a more advantageous solution for placing or positioning a shear web inside the shell portions of a wind turbine blade.

SUMMARY OF THE INVENTION

According to the invention, there is provided an improved method for wind turbine blade manufacture. Also according to the invention, there is provided improved apparatus for wind turbine blade manufacture. Still further according to the invention, there is provided a wind turbine blade manufactured employing the method of the invention. The method of invention is defined in the appended independent claim 1. Preferred, optional features thereof are defined in appended subclaims 2-11. A positioning jig according to the invention is defined in appended claim 12. Further optional features thereof are defined in appended subclaims 13-14. A wind turbine blade manufactured according to the invention is defined in appended claim 15.

According to the invention, there is provided a method for manufacturing a wind turbine blade comprising moulding a first and a second blade shell portion in respective first and second mould tools, positioning a shear web in a predetermined standing position, extending in a spanwise direction within a first shell portion in a first mould tool, anchoring the shear web in position in the first shell portion and closing the second shell portion over the first shell portion to thereby generate a wind turbine blade shell defining a chordwise extent between a trailing edge and a leading edge thereof, and a spanwise extent between a root region and a tip thereof, and wherein the shear web, bordered by a first and a second longitudinal edge, extends in a thickness direction of the blade. According to the invention, the method further comprises providing a positioning jig and securing it to the shear web, preferably disengageably, prior to its introduction into the first shell half, and then guiding the shear web into a predetermined standing position in the first shell half, with its first longitudinal edge adjacent a first shell portion. This is accomplished by engaging a reference surface of the positioning jig with a locating surface at the first mould tool thereby to bring the positioning jig into its guide position, with the shear web in its predetermined, preferably standing, position. The positioning jig is then removed from the first mould tool prior to closing a second shell half over the first shell half. The shear web is thereby reliably positioned at its intended chordwise location in the shell.

This method has the advantage of utilising the mould tool itself as a locating device for reliably and accurately installing and positioning a shear web in a blade shell mould during blade shell manufacture. Thus, the positioning of a shear web by this method does not require highly automated, mechanised or gantry-type positioning equipment for that task. Nor is there a need to use sophisticated positioning equipment for the task. Moreover, this method allows wind turbine blades to be manufactured to single shear web designs while ensuring accurate positioning and fixing thereof in the shell during manufacture, and thereby also in the finished blade.

In another aspect, the invention comprises a positioning jig configured for use in a wind turbine blade manufacturing method and comprising a body portion between a head portion and a foot portion thereof, wherein the head portion is configured for disengageable, secure engagement with a shear web and wherein the foot portion comprises a reference surface. The reference surface is preferably configured to be capable of resting on, at, or against a locating surface at a blade shell moulding tool. The positioning jig is preferably capable of being supported at its foot portion via said reference surface. The positioning jig is preferably portable. The positioning jig is preferably mobile. The positioning jig is preferably capable of being handled by operatives without the use of powered lifting equipment or manual lifting equipment. Preferably, the positioning jig is capable of being manually handled by operatives without the use of any lifting equipment or manually handled with the use of manual lifting equipment and without the use of powered lifting equipment. The invention may in particular comprise a set of three or four or more positioning jigs. A positioning jig or a set of such jigs suitable for use in a method of the invention may comprise one or more ligaments, preferably at least one ligament per positioning jig.

In another aspect, the invention comprises a wind turbine blade manufactured according to the method of the invention including, optionally any optional aspects of said method. The wind turbine blade includes a shear web which may optionally exhibit one or more locating elements capable of mutual positional interaction with one or more corresponding locating elements at a positioning jig. Optionally, the shear web may exhibit one or more engagement elements capable of disengageable, secure engagement with corresponding elements at said positioning jig. Still optionally, the wind turbine blade of the invention may exhibit one or more ligaments extending between the shear web and an internal surface of the blade shell. Optionally, the wind turbine blade may be constructed with an additional minor web such as a trailing edge web. Hence, the term "single web" or "single shear web" in the context of the present disclosure is to be understood to designate a blade construction comprising a single main web. Here, by "main web" is meant a single web which extends between respective blade shells at or near to the maximum blade thickness and which extends at least sixty percent or more preferably at least seventy percent or at least eighty percent or at least ninety percent of the spanwise blade length from root to tip. The single web may be made up of multiple longitudinal segments arranged end-to-end in a line to form a single web. A minor web may preferably extend no more than forty percent of the length of the main web, or no more than thirty percent of the length of the main web, or no more than twenty five percent of the length of the main web or no more than twenty percent of the length of the main web. In the method of the invention, preferably two or more or three or more or four or more positioning jigs may be used in association with a single web to be positioned. Hence, in aspects, the present invention may relate to a method for making a wind turbine blade having a single main shear web. Hence, in aspects, the present invention may relate to a wind turbine blade having a single main shear web.

Additional features of the invention, including optional aspects or embodiments thereof, are discussed below with reference to a non-limiting example. It is hereby stated, for the avoidance of doubt, that the illustrated example does not and is not intended exhaustively to illustrate each and every possible embodiment or combination of features according to the invention. All disclosed features or features recited in subclaims are to be considered capable of being combined, interchanged or substituted even where this is not expressly stated, unless manifestly prevented from such e.g. by the laws of physics. The scope of protection according to the invention is defined by the appended claims.

DETAILED DESCRIPTION AND FIGURES

Figure 2:
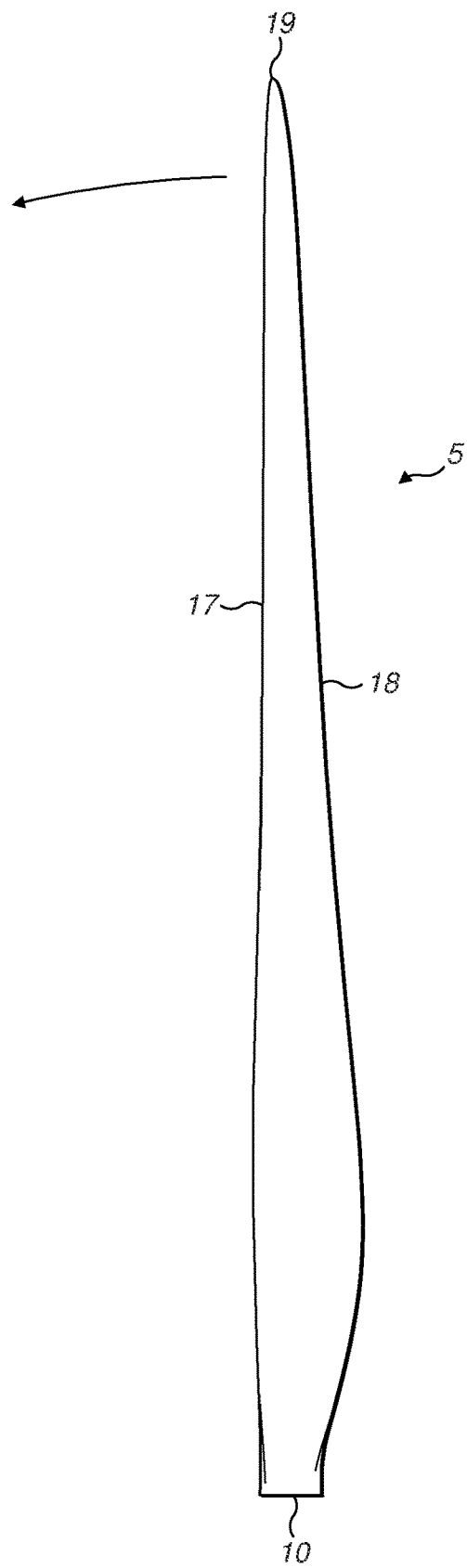
Figure 3:
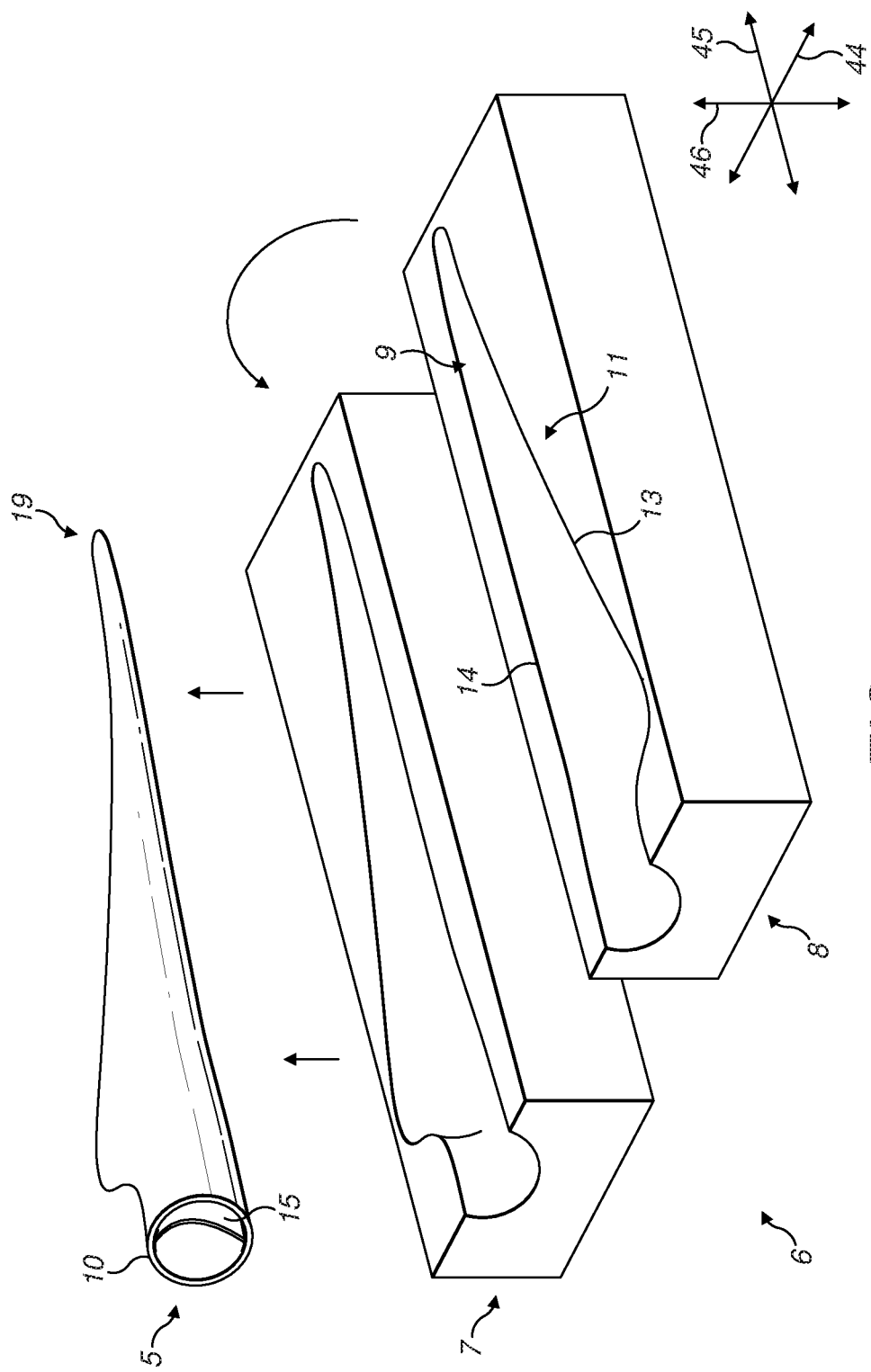
Figure 4:
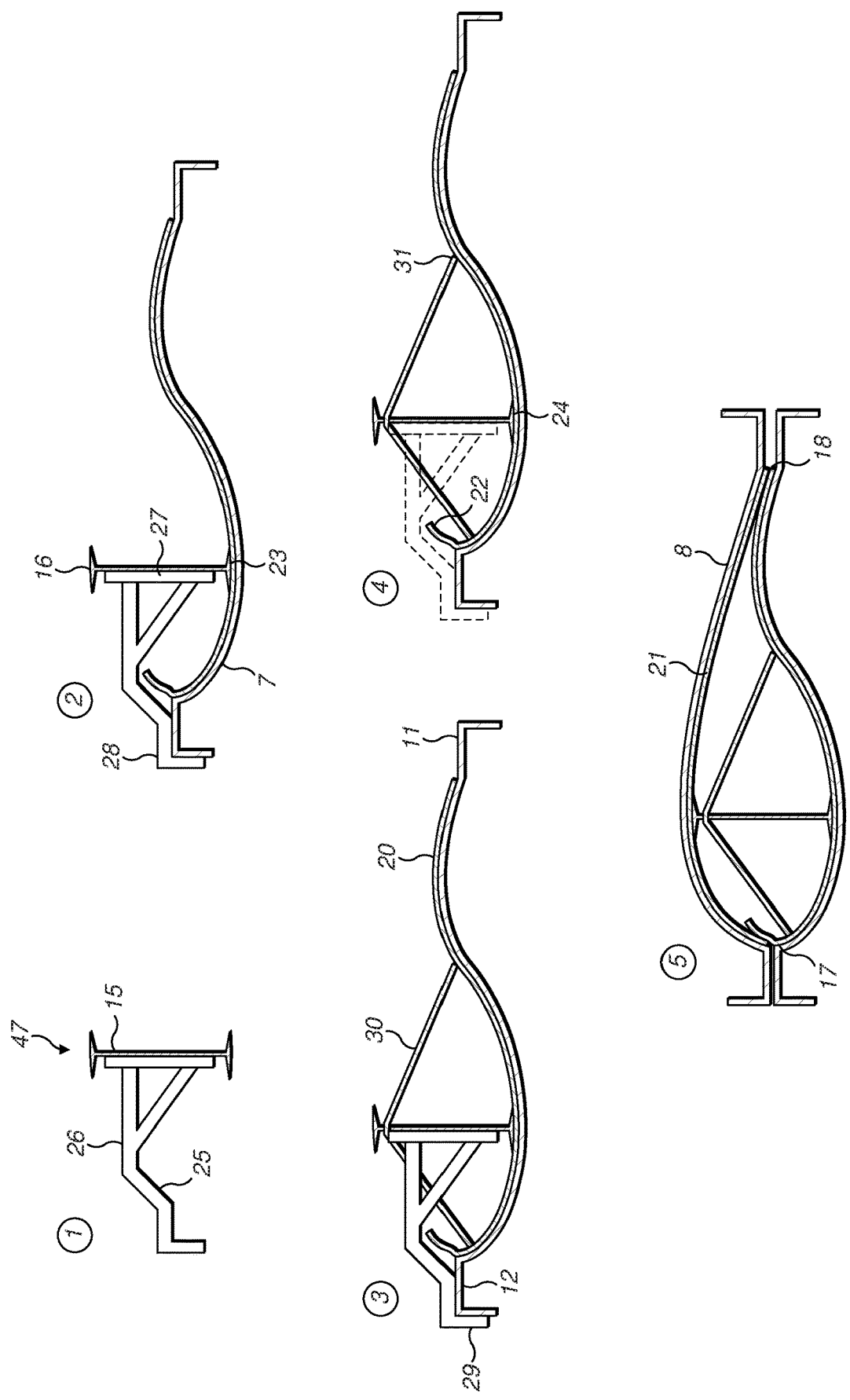
Figure 5A:
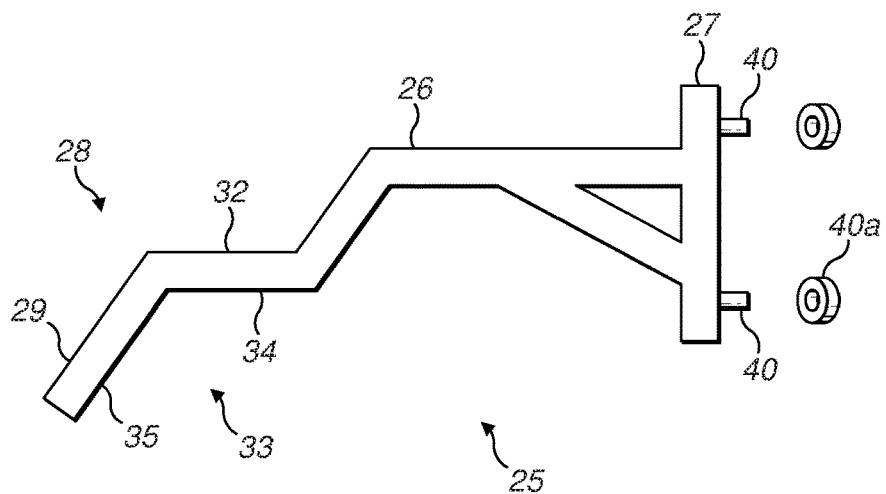
Figure 5B:
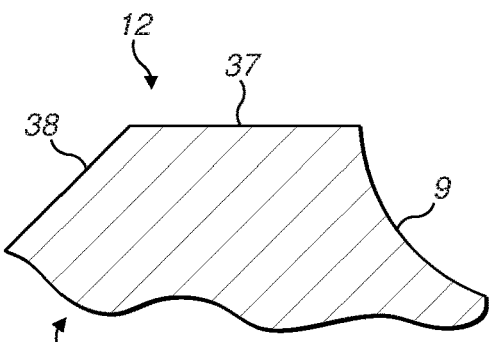
Figure 5C:
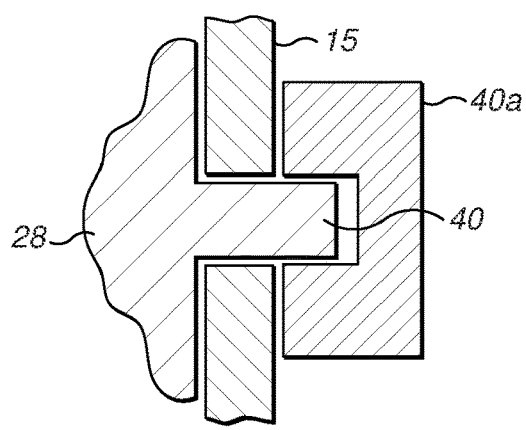
Figure 6A:
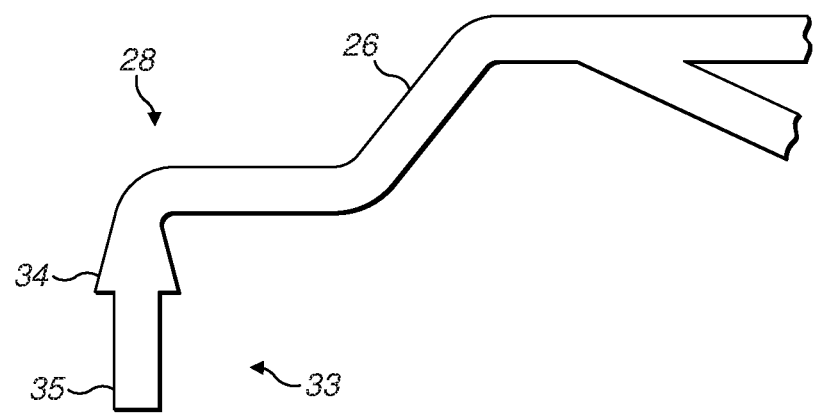
Figure 6B:
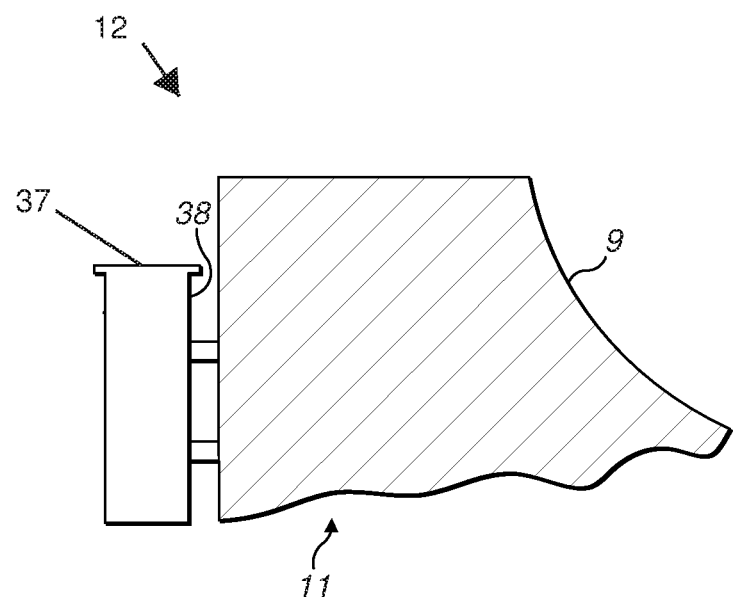
Figure 7:
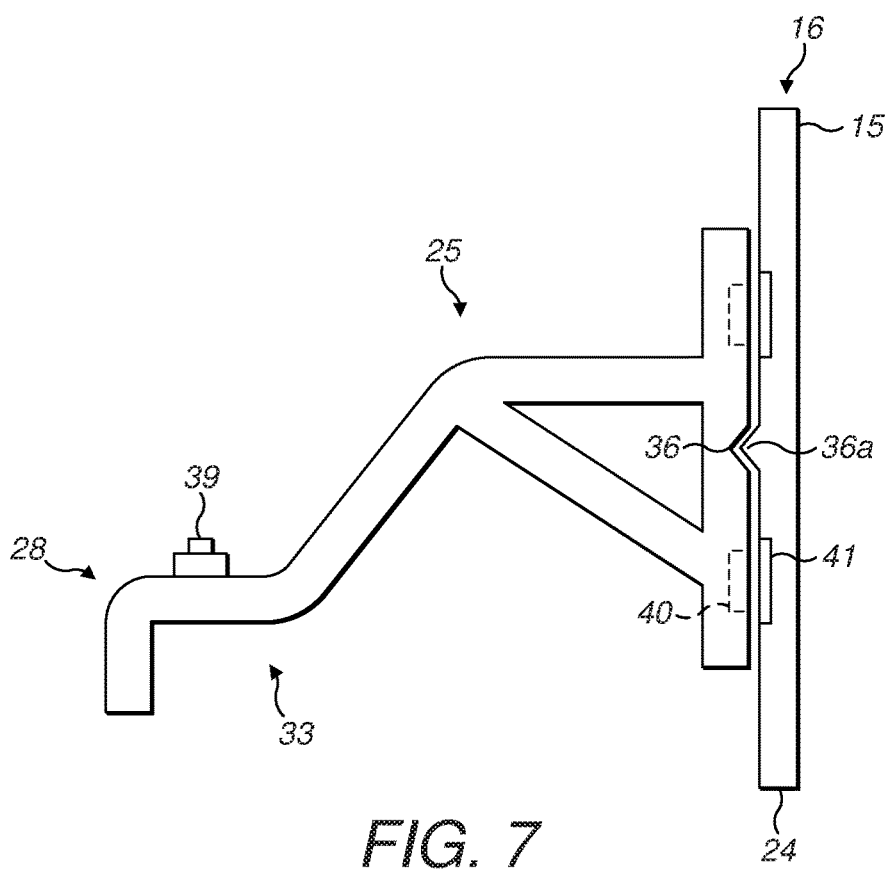
Figure 8:
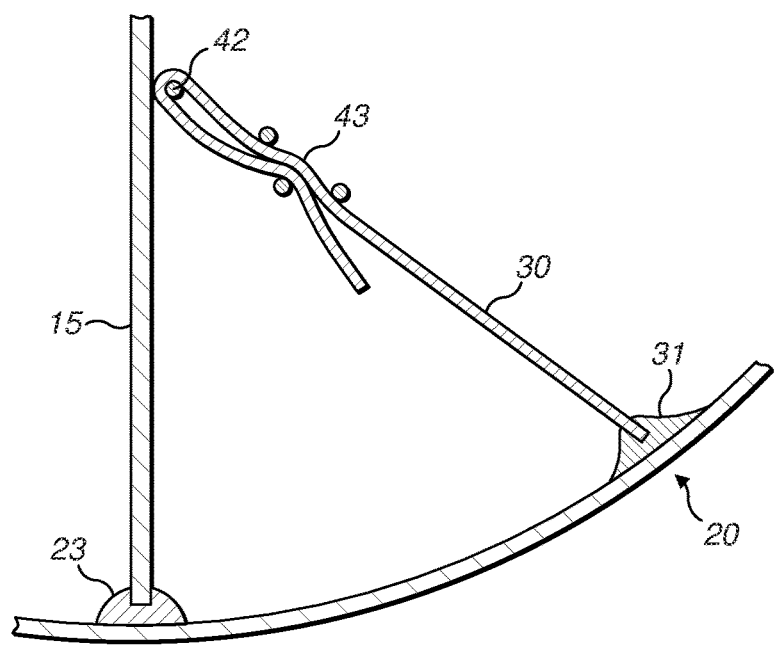
Figure 9:
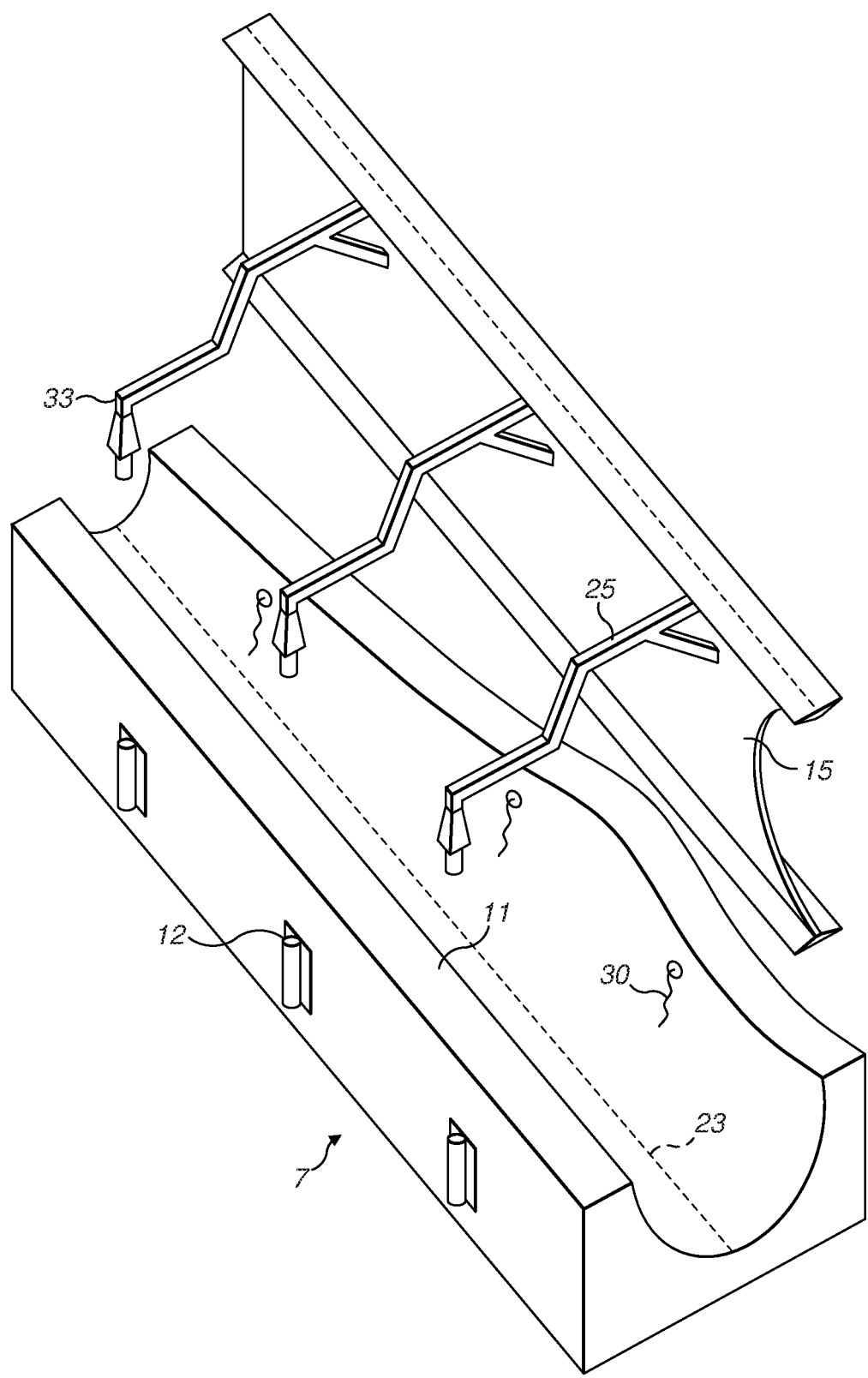

The invention will be described in the following with reference to the figures in which FIG. 1 illustrates a large modern wind turbine, FIG. 2 illustrates a wind turbine blade, as seen from the side, FIG. 3 illustrates a simplified, schematic perspective view of parts of a mould and wind turbine blade FIG. 4 illustrates process steps according to aspects of the invention FIG. 5a illustrates side view of an example of a positioning jig according to aspects of the invention FIG. 5b illustrates a partial cross-section view of a mould edge region according to aspects of the invention FIG. 5c illustrates a partial cross-section view of a detail of a connection between a jig and shear web according to aspects of the invention FIG. 6a illustrates a partial side view of alternative aspects of a positioning jig according to aspects of the invention FIG. 6b illustrates a partial cross-section view of a mould edge region according to alternative aspects of the invention FIG. 7 illustrates simplified schematic side view of an exemplary features of a positioning jig and shear web according to aspects of the invention FIG. 8 illustrates a partial cross-section view of additional aspects of the invention FIG. 9 illustrates a schematic perspective view of an aspect of the method according to aspects of the invention FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

FIGS. 2 and 3 illustrate a wind turbine blade 5 as seen from the side (FIG. 2) or in perspective (FIG. 3) along with a schematic illustration of a mould 6 (FIG. 3). The wind turbine blade 5 comprises a chordwise extent between a leading edge 17 and a trailing edge 18, a spanwise extent between a root 10 and tip 19, and a thickness between respective first and second shell halves 20, 21. FIG. 3 contains an indication of the respective chordwise 44, spanwise 45, and thickness 46 directions, which are common to both the mould 6 and to a blade 5.

As illustrated, a wind turbine blade 5 known in the art is made of two complementary blade halves, namely a first blade shell portion 20 and a second blade shell portion 21. The blade 5 is typically hollow, except for one or more strengthening members extending substantially the entire length of the blade 5 or part of the blade's 5 length. The blade halves or first and second portions 20, 21 are made up in a mould 6 usually connected along a common seam by means of adhesive. Blade shells may comprise fabric or fibre reinforcement lay-ups consolidated in a resin matrix which may be infused through the fabric layers in the mould 6. A wind turbine blade 5 known in the art is typically made of a glass fibre and resin composite reinforced by carbon fibre, carbon fibre reinforced wood or a combination thereof.

Strengthening members in the form of a load carrying structure are provided inside the blade shells 20, 21, usually in the form of an elongate box spar (not shown) or in the form of two or more shear webs. The strengthening member, internal of a blade and arranged between the respective pressure and suction side blade shells, provides stability to the blade in particular by resisting shear or compression or tension forces unleashed when a blade is bent between tip and root e.g. by the action of wind. The compression or tension forces arising from bending of a blade may act spanwise, thickness-wise or at a shear angle between these two directions. In the case illustrated, it is proposed to provide only a single shear web 15 in order to reduce weight, to simplify the blade design, and to reduce costs. Where more than one spanwise reinforcing web is present, these are often arranged side by side (not shown) and positioned in a leading edge or trailing edge direction away from or astride the blade's maximum thickness. In embodiments according to the invention, the web 15 may extend substantially parallel to a thickness direction 46 of the blade 5 at any or all locations along the web's spanwise extent. In embodiments, the web 15 may be positioned wholly or partly along or closely adjacent to a maximum thickness internal extent of the blade shells 20, 21.

A mould 6 is illustrated having a first mould tool 7 and a second mould tool 8, each mould tool having a blade shell moulding region 9 bordered by a mould tool edge region 11 external of a blade trailing edge mould region 13 and a blade leading edge mould region 14. In other words, the mould tool edge region 11 may surround the blade mould surface 9. The blade shell surface 9 of a mould tool can be defined as that surface of the mould tool which corresponds to a first blade shell portion 20 when the first shell portion 20 is in the mould and in particular, it may correspond to the mould tool surface extending between a trailing edge 18 and a leading edge 17 of the first shell portion 20.

When the blade shell halves 20, 21 are cured and hardened, and with a load-carrying internal structure in place, the second mould tool 8 may be turned over on top of the first mould tool 7 (see the long curved arrow in FIG. 3 indicating the mould turning direction) thereby to bring the respective first and second blade shell halves 20, 21 into abutment along a common bonding seam.

When the first and second blade shell portions 20, 21 have hardened in the respective mould tools 7, 8, contact surfaces at respective blade shell trailing and leading edges are provided with an adhesive, and the second part 21 is rotated and positioned on top of the first part 20, e.g. by means of some sort of a crane (not shown) or special-build mould-rotating equipment (not shown).

FIG. 4. illustrates stages of an improved manufacturing process according to aspects of the invention. A shear web 15 having a first 24 and a second 16 longitudinal edge and designed to extend spanwise along a blade 5 is to be placed in the first shell portion 20 for cementing therein prior to closing the second blade portion 21 over the first blade shell 21 and the assembled shear web 15. The shear web 15 is positionable with its first longitudinal edge 24 at a predefined chordwise position across the blade shell 20. With only a single shear web 15 to be introduced into the blade 5, some means are required to hold the shear web 15 in its intended position during curing of a bond line 23 between a first longitudinal edge 24 of the shear web 15 and the first shell portion 20.

With only a single shear web 15, its height in a thickness direction 46 of the blade may be greater than in the case in which multiple shear webs would be employed. This increases the tendency for the upper, second edge 16 (or free edge) of the web 15 to move about and possibly shift its position away from its intended or predetermined position, prior to or during application of the second blade shell 21. In order to prevent unwanted drift or shift of the shear web 15 it is proposed, according to the invention, to provide a positioning jig 25 to ensure the correct location and positional stability of the shear web during stages of the blade manufacturing process. Moreover, the present invention proposes to ensure shear web stability in a simple and cost-effective manner using minimal additional equipment.

Diagram 1 in FIG. 4 shows a positioning jig 25 having a body portion 26 extending between a head portion 27 and a foot portion 28. The positioning jig 25 is shown with a shear web 15 secured to it, or put differently: the positioning jig 25 is shown secured to a shear web 15. According to an aspect of the manufacturing method of the invention, the method may include securing a positioning jig 25 at a head portion 27 thereof to a shear web 15. In this context, and according to preferred aspects of the invention, the step of securely engaging a shear web 15 to a positioning jig 25 may include disengageably securing these two elements together.

The illustrated shear web 15 has a first 24 and a second 16 edge which in the case illustrated are optionally in the form of flanges. A web panel of the shear web 15 extends between first 24 and second 16 longitudinal edges. In the case illustrated, the first edge 24 constitutes a lower shear web edge while the second edge 16 constitutes an upper edge. The shear web 15 is securely connected and engaged with to the positioning jig 25 at its head portion 27.

The positioning jig 25, additional exemplary details of which are illustrated in FIG. 5a or FIG. 6a or FIG. 7 comprises a reference surface 33 at a foot portion 28 thereof. The positioning jig 25, in particular a foot region thereof, is capable of being supported in a stable position via its reference surface 33. In addition, a first mould tool 7, preferably in an edge region 11 thereof and preferably externally of a blade shell moulding surface 9, is provided with a locating surface 12 capable of supporting the positioning jig 25 via its reference surface 33. The positioning jig 25 and the shear web 15 connected to it, together may be considered to constitute a web positioning assembly 47. Preferably, the positioning jig 25 and shear web 15 are thereby in mutually supporting engagement. Preferably, the shear web 15, when securely engaged with the positioning jig 25 defines a predetermined geometry in relation to the positioning jig 25. The positioning assembly thereby defines a predetermined, defined geometry in relation to the first mould tool 7 into which the shear web 15 is to be introduced. According to aspects of the invention, the positioning jig 25 and thereby the positioning assembly 47 may be reliably supported in a predetermined position in relation to the first mould tool 8. When introduced into the first blade shell portion 20, the positioning assembly 47 is preferably self-supporting by virtue of the positioning jig reference surface 33 resting on a locating surface 12 at the mould 7 and by virtue of the first edge 24 of the shear web 15 resting along a predetermined bondline 23 on the internal surface of the first blade shell portion 20. When introduced into the first blade shell portion, the positioning jig is preferably constrained in a chordwise and in a thickness direction of the mould 6 or shell 20. This constrained position of the positioning jig 25 and positioning assembly 47 defines a guide position thereof with the shear web 15 in a predetermined standing position. Optionally, when in a guide position, the positioning assembly 47, consisting of the positioning jig 25 and the shear web 15 is supported by a first longitudinal edge 24 of a shear web 15 and by a reference surface 33 of the positioning jig. The position of the web 15 which is illustrated at steps in diagram 2 onwards may in particular correspond to its intended design or reference position within a blade 5. Also visible at step 2 is an upstand 22 in the form of a raised lip which may be provided at the leading edge part 17 of the first blade shell portion 20. It can help to improve the strength of the bonded seam between the first and second blade shell portions 20, 21. In particular, it may form part of a lap joint between respective shell halves at the blade leading edge 17.

After the step in diagram 2 in FIG. 4, the web 15, in its predetermined, design position, may be anchored to the first blade shell portion 20 along a bond line 23 for example by means of adhesive which may be a curable adhesive. Once hardened, the adhesive may hold the shear web 15 sufficiently firmly in place to allow closure of the second blade shell portion 21 over the first blade shell portion 20 and over the anchored shear web 15. This may be achieved as per steps in diagrams 4 and 5, first by disengaging the positioning jig 25 from the shear web 15; removing the positioning jig 25 from the mould tool 7 and from the first blade shell portion 20; and turning a second mould tool 8 on top of a first mould tool 7 such that a second blade portion 21 is brought into position for engagement, by bonding or otherwise, with a first blade shell portion 20 and with a second edge 16 of a shear web 15. The blade construction may be fixed together along its leading and trailing edges, as shown in diagram 5.

In alternative aspects of the invention additional securing means may be implemented for improving the positional stability of a shear web 15 in the first blade shell portion 20, prior to the removal of a positioning jig 25. Accordingly, and as per the step illustrated at diagram 3, a ligament 30 may be fixed between one or both sides of the shear web 15 and a corresponding internal leading edge face or trailing edge face of the first blade shell portion 20. Preferably, the one or more ligaments 30 may be connected at, adjacent to, or nearby a second edge 16 of the web 15. Preferably, the one or more ligaments 30 may be anchored to the inside of the first blade shell portion 20 at, adjacent to, or nearby a leading or trailing edge thereof or at a position on said first blade shell portion 20 between said bond line 23 and a leading or trailing edge of said first blade shell portion 20. With an appropriate, preferably modest level of tension along the one or more ligaments 30, the positional stability of the web 15 can thereby be further improved. This step may be most relevant for larger dimensioned webs 15, which may exhibit an increased tendency towards positional drift, especially at a free, non-anchored edge thereof, such as at a second edge 16 thereof, which may be an upper edge. Additional details of ligaments are shown in FIGS. 8 and 9. By way of example, a ligament 30 may be provided in the form of a length of rope or webbing or other flexible line, preferably made from relatively inextensible material. In optional aspects, one end of a ligament 30 may be pre-installed anchored at a shear web 15, or pre-installed anchored at a first blade shell portion 20, or both. A free end of a pre-installed ligament 30 may be passed through a connecting element 42 such as a loop or retainer or eye, at one or other of a shear web 15 or at a first blade shell portion 20. By way of example, an appropriate amount of tension may be applied to the ligament 30 before securing it, for example, using a sliding buckle 43 or by tying it off, either to itself or to a free end of another complementary ligament 30. Hence, the manufacturing method may further include the step of applying tension to one or more ligament 30 after attachment of the same between a shear web 15 and a first blade shell portion 20. One end of a pre-installed ligament 30 may for example be secured to a first blade shell portion 20 or shear web 15 using adhesive. Still alternatively, a single ligament 30, anchored at one end to the first blade shell portion 20 may be passed through an aperture such as a friction aperture or other suitable opening or passage in the shear web 15, preferably towards its second edge 16, and fastened to the first blade shell portion 20 on the opposite side of the shear web 15. Fastening may be by means of an anchored connecting element such as a loop, anchored to the first blade shell portion 20 or by any other means such as adhesive means or hook-and-loop fastener means or combinations of these. The manufacturing method may further include the step of applying tension to said one or more ligament 30 before, during or after attachment of same between said shear web 15 and said first blade shell portion 20. A suitable material for a ligament 30 may include inextensible materials. Ligaments comprising polymer materials such as polyamides or aramids may be especially suitable. Tensioning means may be used in the form of a tensioning buckle or for example, a tensioning step may be carried out by applying heat to the ligament 30 e.g. by blowing hot air on it. In the latter case, the material of the ligament should be selected to be a heat-shrinkable polymer. Alternatively, hand-tension may be applied. This may be achieved in connection with tying-off a ligament end or in connection with the use of a sliding buckle or in connection with the use of hook and loop fastenings or in connection with a friction aperture at either or more than one of the shell 20 surface or the web 15.

Bonding means, such as adhesive, may preferably be applied to the second edge 16 of the web 15 prior to closing the second blade shell portion 21 over the first blade shell portion 20. The hardening process of a bond line between the second blade shell portion 21 and the second edge 16 may take place with the additional positional stability offered by the one or more ligaments 30.

As suggested in FIG. 9, there may be one or two or three or more positioning jigs 25 and the same number or a different number of ligaments 30 or sets of ligament pairs 30 in any blade shell 20. In embodiments, there may be provided successive positioning jigs 25 at intervals along the spanwise length of the blade shell. In FIG. 9, the mould tool 7 and the web 15 are illustrated in truncated form for simplicity and the ligaments 30 and other elements are illustrated schematically only.

As mentioned, the positioning jig 25 may be supported and accurately located in its guide position by means of a reference surface 33 at the locating jig 25 and by virtue of its secure, geometrically defined engagement with a shear web 15, by resting on a lower edge 24 of the shear web. The reference surface 33 may preferably be shaped to accurately conform to a locating surface 12 at a relevant mould structure. Alternatively, a reference surface 33 and a locating surface 12 may be shaped or configured such that they accurately conform in respect of at least two points of contact. This ensures a simple and efficient and accurate and repeatable means and method for bringing the positioning assembly 47 and thereby both shear web 15 and jig 25 into the desired position for manufacture.

As illustrated by way of example at FIGS. 5a, 5b, 6a and 6b, a reference surface 33 at a positioning jig 25 may include a first reference surface portion 34 configured for resting on a support surface 37, and a second reference surface portion 35 configured for resting against an abutment surface 38. In this context, a support surface 37 may be a first locating surface portion on a mould tool 7 and an abutment surface 38 may be a second locating surface portion on a mould tool. These first and second reference surface portions 34, 35, when engaged in contact with corresponding locating surface portions (e.g. at a mould tool 7) may be capable of preventing movement of the positioning jig 25 along two mutually orthogonal axes. Preferably, these axes may be in particular along chordwise and thickness directions of a blade 5 or blade mould 6.

Hence, reference surface 33 and co-operating locating surface 12 or reference surface portions 34, 35 or locating surface portions 37, 38 may be configured in any appropriate way such as generally planar surfaces, as illustrated in FIG. 5a or 5b or as pin and socket type surfaces as illustrated in FIG. 6a or 6b or combinations of these. In aspects of the invention, a reference surface 33 of a positioning jig 25 may be provided at a foot portion 28 thereof. A said foot portion 28 may include a knee portion 32 and a toe portion 29, the knee portion having a said first reference surface portion 34 and said toe portion 29 having a said second reference surface portion 35.

As illustrated in FIGS. 6a, 6b, and FIG. 9 a support surface 12 at a mould edge region 11 may comprise a socket type fitting for restraining the foot 28 of the jig 25 at a toe portion 29 thereof which may be formed in the shape of a tongue to fit within a said socket. A collar around the tongue at a toe portion 29 of the jig foot 28 may serve as an additional or alternative reference surface on the jig 25. A support surface 37 may be provided on the socket for keeping the jig 25 in its guide position in relation to the mould tool 7. This may be additional or alternative to a supporting surface 37 on the mould edge region 11. In embodiments a reference surface portion of the foot 28 of a jig 25 may engage and be restrained in a socket at the periphery of a mould tool 7 while a further portion of the jig 25 reference surface 33 may overlie a further locating portion 11 of the mould periphery.

Preferably, optionally, the positioning jig 25 may comprise one or more locating elements 36 capable of mutual positional interaction with one or more corresponding locating elements 36a at a shear web. In FIG. 7, these are illustrated in the form of a recess on the contact surface of the head portion 27 of the jig 25, while a co-operating locating projection is provided at a corresponding location on the shear web 15. An inverse arrangement may also be envisaged. The coupling of respective locating elements 36, 36a ensures that engagement elements 40, 41 of respective web 15 and jig 25 are in alignment. In addition, with the jig 25 and shear web 15 held together with their respective locating elements in mutual alignment and in mutual contact, it is ensured that the positioning assembly 47 exhibits its desired, predetermined geometry. Locating elements 36, 36a may for example include a variety of co-operating recesses or projections applied to contacting regions of either or both the shear web 15 or the jig 25. Alternatively or additionally, locating elements 36, 36a may consist in markings applied to one or both the shear web 15 or the jig 25, for example, at or nearby contacting regions thereof.

Still further, the positioning jig 25 may optionally, preferably comprise one or more engagement elements 40 capable of disengageable, secure engagement with corresponding engagement elements 41 at said shear web 15. In one example, shown in FIG. 5a, engagement elements 40 are shown by way of pins designed to fit in holes provided in a shear web 15. Still with reference to FIG. 5a, the engagement pins may for example be threaded such that co-operating clamping elements 40a such as fixing nuts, also indicated in FIG. 5a may be secured to portions of an engagement pin which projects through the main panel of a shear web 15 when it is in position against the contact face of the head portion 27 of the jig 25. See FIG. 5c, additionally showing a recessed clamping element 40a threaded on an engagement pin thereby securely restraining shear web 15 against the head portion 27 of a positioning jig 25 by means of holes 41 through a shear web 15 main panel portion. In the example of FIG. 5c, the locating engagement elements 40, 41 may additionally function as locating elements. In this case, it would additionally be desirable to ensure precise manufacturing tolerances of the engagement elements 40, 41, in order to guarantee the desired predetermined geometry of the positioning assembly 47. Alternatively, it may be preferred to provide a threaded recess (not shown) in a portion such as a head portion 27 of a positioning jig 25, sized and positioned to co-operate with a fixing bolt (not shown) to be passed through a hole 41 at a relevant location in a shear web 15. Suitable engagement elements 40, 41 may in particular comprise one or more twist-lock elements or latching-pin elements capable of or configured for co-operating with one or more corresponding catch elements at a said shear web 15. Alternatively or additionally, suitable engagement elements 40 at a positioning jig 25 may comprise magnets or magnetic or electromagnetic elements capable of or configured for co-operating with magnetically attractive or magnetic elements at a said shear web 15. Alternatively or additionally, suitable engagement elements 40, 41 may comprise vacuum or partial vacuum type suction elements capable of or configured for co-operating with a corresponding surface such as a smooth surface at a said shear web 15. Alternatively, suitable engagement elements 40, 41 may comprise any combination of one or more different types of engagements elements 40, 41. Preferably, suitable engagement elements 40, 41 at the positioning jig 25 and shear web 15 may permit pre-attachment of these elements to form a positioning assembly 47 prior to its introduction into a first blade shell portion 20. After the shear web 15 has become anchored along its bond line 23 to the first blade shell portion 20, the engagement elements 40, 41 should permit easy release of the positioning jig 25 and its disengagement from the shear web 15, which preferably, prior to release of the positioning jig 25, has become integral with the first blade shell portion 20.

Release of the jig 25 from the shear web 15 may be carried out by directly accessing and disengaging the respective engagement elements 40, 41, e.g. by unscrewing a nut, bolt, or clamping element or otherwise releasing co-operating engagement elements 40, 41 and thereafter removing the positioning jig 25 from the first mould tool 7.

Optionally, the positioning jig 25 may comprise an actuator 39 for disengaging the engagement elements 40 from engagement with corresponding engagement elements 41 of a shear web 15. Preferably an actuator 39 may be manually operable by an operative. Preferably, and actuator 39 may comprise an actuator mechanism for disengaging the engagement elements 40, 41. A suitable actuator 39 or actuator mechanism may be mechanical or electromechanical or hydraulic. The type of actuator or actuator mechanism comprised in the positioning jig 25 may in particular depend upon the type of engagement elements 40 at the head portion 27 thereof. For one or more magnetic engagement elements, a suitable actuator 39 (see FIG. 7) may additionally comprise a pusher mechanism capable of transmitting a separating force between the positioning jig 25 and a shear web 15 connected to it. For one or more electromagnetic engagement elements, a suitable actuator may additionally comprise a circuit-breaker capable of disabling the magnetic effect of an electromagnet at a head portion of the positioning jig. For one or more latching-pin engagement elements, a suitable actuator may additionally comprise a pulling mechanism capable of retracting a latching-pin at e.g. the head portion 27 of the positioning jig 25 from a co-operating catch 41 at a shear web connected to it. For one or more twist-locking engagement elements 40, a suitable actuator may additionally comprise a torsional drive mechanism capable of rotating a locking lug out of engagement with a co-operating catch 41 at a shear web 15 connected to it. For one or more vacuum-, partial vacuum-, underpressure- or suction-type engagement elements 40 such as cups or pads, a suitable actuator may comprise a venting valve with associated linkages for equalizing air pressure between a relevant cup or pad and a shear web surface 41. Any actuator mechanism may include force-transmitting linkage elements such as shafts or hydraulic couplings. Additional locking devices or actuator mechanisms may be conceived for this purpose. By these means, the positioning jig 25 may be quickly, easily and reliably disengaged from its secure engagement with a shear web 15. Therefore, in particular, in aspects, a positioning jig 25 may comprises an actuator 39 for disengaging the engagement elements 40. In aspects, the disengagement actuator may be manually operated.

Preferably, an actuator 39 may be located at a body region 26 of said positioning jig 25. Still further preferably, an actuator 39 may be positioned at a foot region 28 of said positioning jig 25. By this arrangement an operative may disengage the positioning jig 25 from a shear web 15. In particular, an operative may operate the actuator 39 without entering the mould tool 7 or blade shell portion 21 therein, preferably from a position outside the mould tool 7 or outside the edge 11 of the mould tool 7. Preferably, the positioning jig 25 may be removed from the mould tool 7 and blade shell portion 21 without any operative entering the relevant mould 7, 8. Preferably, the positioning jig may be removed from the mould by an operative, without any operative entering the mould. Preferably, the positioning jig 25 may be removed from the mould 6 without the need for lifting equipment to enter the mould tool 6 or parts 7, 8 thereof.

Preferably, in optional aspects of the invention, the positioning jig 25 may be portable, in particular, it may be portable such that it may be put in place in, or removed from, a mould tool by an operative with minimal or no mechanical intervention. Preferably, optionally the positioning jig 25 may be mobile. Preferably, optionally the positioning jig may be handled or utilised in the method of the invention independent of mechanical transport or positioning means. Preferably, optionally the positioning jig 25 may be placed in its guide position independently of mechanical transport or positioning means.

Preferably, the shear web 15 is disengageably secured to the positioning jig 25. This arrangement will ensure that the jig 25 can be removed from its guide position, leaving the shear web 15 in its predetermined standing position in a first blade shell portion 20.

Optionally, the positioning jig 25 may be kept in place in its guide position at a first mould tool 7 during curing of an adhesive bond line between a first longitudinal edge 24 of the shear web 15 and the first blade shell portion 20. This curing step, with the positioning jig 25 in its guide position, may be carried out prior to applying the second shell portion 21 onto the first shell portion 20, preferably, by rotating a second mould tool 8 over a first mould tool 7.

The invention has been exemplified above with reference to specific examples of wind turbine blades 5 and wind turbine blade manufacturing facilities or apparatus. However, it should be understood that the invention is not limited to the particular examples described above but may be designed and altered in a multitude of varieties within the scope of the invention as specified in the claims.

The mould tool referred to herein may be otherwise a known as a mould. The first mould tool referred to herein may be otherwise known as a stationary mould tool or stationary mould or bottom mould tool or bottom mould or lower mould tool or lower mould. The second mould tool may also be known as a mobile mould tool or mobile mould or top mould tool or top mould or upper mould tool or upper mould. A single moulding element for moulding a blade shell portion may also be known as a mould half, whether stationary or movable, whether top- or bottom. A blade shell portion such as a suction-side blade shell or a pressure-side blade shell may also be known as a blade shell half or shell half or blade half. A pressure side shell portion or shell half may also be known as a windward shell half or windward shell portion. A suction side shell portion or shell half may also be known as a leeward shell half or leeward shell portion.

A lower mould half may correspond to a suction side blade shell portion or to a pressure side blade shell portion.

NUMBERING LIST

1. Wind turbine
2. Tower
3. Nacelle
4. Rotor
5. Blade
6. Mould
7. First mould tool
8. Second mould tool
9. Blade shell mould
10. Blade root
11. Mould edge region
12. Locating surface
13. Blade shell mould trailing edge
14. Blade shell mould leading edge
15. Shear web
16. Second edge
17. Leading edge
18. Trailing edge
19. Blade Tip
20. First blade shell portion
21. Second blade shell portion
22. Upstand
23. Bond line
24. First edge
25. Positioning jig
26. Body portion
27. Head portion
28. Foot portion
29. Toe portion
30. Ligament
31. Anchor
32. Knee portion
33. Reference surface
34. First reference surface
35. Second reference surface
36, 36a. Locating element
37. First locating surface
38. Second locating surface
39. Actuator
40. Jig engagement element
41. Shear web engagement element
42. Retainer
43. Sliding buckle
44. Chordwise direction
45. Spanwise direction
46. Thickness direction
47. Positioning assembly

The invention claimed is:

1. A method for manufacturing a wind turbine blade, comprising:
    moulding a first and a second blade shell portion in respective first and second mould tools, the first mould tool having a locating surface;
    providing a set of three or more positioning jigs, each positioning jig being configured for manual movement and having a reference surface;
    securing the three or more positioning jigs to a shear web, the shear web bordered by a first and a second longitudinal edge, the three or more positioning jigs being spaced apart along a length of the shear web;
    after securing the three or more positioning jigs to the shear web, engaging the reference surface of each positioning jig with the locating surface of the first mould tool thereby placing each positioning jig into a guide position and the shear web in a predetermined position within the first blade shell portion;
    removing the three or more positioning jigs from the shear web and the first mould tool; and
    closing the second blade shell portion over the first blade shell portion to form a wind turbine blade shell.

2. The method according to claim 1, said locating surface and said reference surface being configured for mutually contacting engagement in which relative movement therebetween along a chordwise and/or a thickness direction is blocked, in particular, when said positioning jig is in said guide position.

3. The method according to claim 1, when in a guide position, the positioning assembly, consisting of said positioning jigs and said shear web is supported by said first longitudinal edge of said shear web and by said reference surface of said positioning jigs.

4. The method according to claim 1, wherein each said positioning jig and said shear web are provided with engagement elements for mutual, secure, disengageable engagement.

5. The method according to claim 1, further including disengaging each said positioning jig from said shear web by means of a disengagement actuator located on said positioning jig prior to removal of said positioning jig from said first mould tool.

6. The method according to claim 1, further including the step of immobilizing said second longitudinal edge of said shear web in relation to said first shell portion, with each said positioning jig in its guide position and prior to disengaging said positioning jig from said shear web.

7. The method according to claim 6, wherein said step of immobilizing said shear web includes the step of attaching one or more ligaments between said first shell portion and a part of said shear web which is closer to its second longitudinal edge than to its first longitudinal edge.

8. The method according to claim 7, wherein a said ligament is arranged to extend from said shear web in a direction towards a leading edge region and/or trailing edge region of said first shell portion.

9. The method according to claim 7, wherein a first end of one or more said ligaments is/are pre-attached to said first shell portion prior to introducing said shear web into said first shell portion and wherein a second end of said one or more ligaments is attached to said shear web when said positioning jig is in said guide position.

10. The method according to claim 7, wherein a first end of one or more said ligaments is/are pre-attached to said shear web prior to introducing said shear web into said first shell portion and wherein a second end of said one or more ligaments is attached to said first shell portion when said positioning jig is in said guide position.

* * * * *